United States Patent
Ozawa et al.

(10) Patent No.: US 8,909,423 B2
(45) Date of Patent: Dec. 9, 2014

(54) VEHICLE DISPLAY DEVICE

(75) Inventors: Yuuki Ozawa, Atsugi (JP); Hidenori Hokura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 153 days.

(21) Appl. No.: 13/700,689

(22) PCT Filed: Jul. 5, 2011

(86) PCT No.: PCT/JP2011/065389
§ 371 (c)(1),
(2), (4) Date: Nov. 28, 2012

(87) PCT Pub. No.: WO2012/005255
PCT Pub. Date: Jan. 12, 2012

(65) Prior Publication Data
US 2013/0079986 A1    Mar. 28, 2013

(30) Foreign Application Priority Data

Jul. 9, 2010  (JP) .................................. 2010-156663

(51) Int. Cl.
| | |
|---|---|
| *B60K 35/00* | (2006.01) |
| *B60K 37/02* | (2006.01) |
| *B60W 10/02* | (2006.01) |
| *B60W 10/06* | (2006.01) |
| *B60W 10/08* | (2006.01) |
| *B60W 20/00* | (2006.01) |
| *B60W 30/18* | (2012.01) |
| *B60W 50/14* | (2012.01) |

(52) U.S. Cl.
CPC ................ *B60K 35/00* (2013.01); *B60K 37/02* (2013.01); *B60W 10/02* (2013.01); *B60W 10/06* (2013.01); *B60W 10/08* (2013.01); *B60W 20/00* (2013.01); *B60W 30/18027* (2013.01); *B60W 30/18118* (2013.01); *B60W 50/14* (2013.01); *B60K 2350/1064* (2013.01); *B60K 2350/1076* (2013.01); *B60W 2050/146* (2013.01); *B60W 2520/403* (2013.01); *B60W 2520/406* (2013.01); *Y02T 10/6286* (2013.01)
USPC ........... 701/36; 340/438; 340/441; 340/815.4

(58) Field of Classification Search
USPC ............. 701/36; 340/438, 441, 815.4, 815.44
See application file for complete search history.

(56) References Cited

U.S. PATENT DOCUMENTS 7,145,442 B1 * 12/2006 Wai .............................. 340/438

FOREIGN PATENT DOCUMENTS

| JP | 61-244627 | 10/1986 |
|---|---|---|
| JP | 2007-322343 A | 12/2007 |

(Continued)

OTHER PUBLICATIONS

International Search Report of PCT/JP2011/065389 dated Jul. 20, 2011, mailed Aug. 2, 2011.

(Continued)

*Primary Examiner* — Mary Cheung
*Assistant Examiner* — Michael Berns
(74) *Attorney, Agent, or Firm* — Global IP Counselors, LLP (57) ABSTRACT

A vehicle display device includes a vehicle instrument panel, upper-side and lower-side segment displays and a display controller. Each of the upper-side and lower-side segment displays has at least three number-displaying elements that are arranged in a line in a lateral direction for displaying numerical values using a plurality of segments. The display controller is configured to combine the number-displaying elements in the upper-side and lower-side segment displays and to display vehicle information.

14 Claims, 5 Drawing Sheets

(56) References Cited

FOREIGN PATENT DOCUMENTS

| | | |
|---|---|---|
| JP | 2008-215174 A | 9/2008 |
| JP | 2009-29181 | 2/2009 |
| JP | 2010-102089 A | 5/2010 |

OTHER PUBLICATIONS

An English translation of the Japanese Office Action for the corresponding Japanese Application No. 2012-523882, issued on Sep. 10, 2013.

* cited by examiner

| Total Drive Force | Auxiliary Drive Wheel Distribution | Auxiliary Drive Wheel Left - Right Distribution Difference | Display Number | | | |
|---|---|---|---|---|---|---|
| | | | 1R | 1L | 2R | 2L |
| HIGH | HIGH | HIGH | 2 | 2 | 0 | 3 |
| | | LOW | 2 | 2 | 1 | 2 |
| | LOW | HIGH | 3 | 3 | 0 | 2 |
| | | LOW | 3 | 3 | 0 | 1 |
| MEDIUM | HIGH | HIGH | 1 | 1 | 0 | 3 |
| | | LOW | 1 | 1 | 0 | 2 |
| | LOW | HIGH | 2 | 2 | 0 | 2 |
| | | LOW | 2 | 2 | 0 | 1 |
| LOW | — | HIGH | 1 | 1 | 0 | 2 |
| | | LOW | 1 | 1 | 0 | 1 |

VEHICLE DISPLAY DEVICE

CROSS-REFERENCE TO RELATED APPLICATIONS

This application is a U.S. National stage application of International Application No. PCT/JP2011/065389, filed Jul. 5, 2011, which claims priority claims priority under to Japanese Patent Application No. 2010-156663, filed in Japan on Jul. 9, 2010, the entire contents of which is hereby incorporated by reference.

BACKGROUND

1. Field of the Invention

The present invention generally relates to a vehicle display device.

2. Background Information

In a conventional four-wheel drive vehicle in which drive force distribution to the front and rear wheels and drive force distribution to the left and right wheels can be adjusted, there are known distribution display devices for a vehicle in which the state of drive force distribution to the front and rear wheels and the state drive force distribution to the left and right wheels are displayed on a liquid crystal screen (e.g., see 2007 Acura MDX Owner's Manual, ACURA, 2006/08/07, p. 77).

SUMMARY

However, in the prior art, there is a problem in that an expensive liquid crystal display is required, which leads to higher cost. Thus, one object of the present invention is to provide a vehicle display device capable of minimizing manufacturing costs.

In the present invention, a number-displaying element having upper-side and lower-side segments arranged vertically in a line are combined to display vehicle information.

Accordingly, in the present invention, manufacturing costs can be minimized because the vehicle information is displayed using a segment display that is less expensive than a liquid crystal screen.

BRIEF DESCRIPTION OF THE DRAWINGS

Referring now to the attached drawings which form a part of this original disclosure.

DETAILED DESCRIPTION OF THE EMBODIMENTS

Embodiments for implementing the vehicle display device of the present invention are described below with reference to the embodiments in the drawings.

Figure 1:
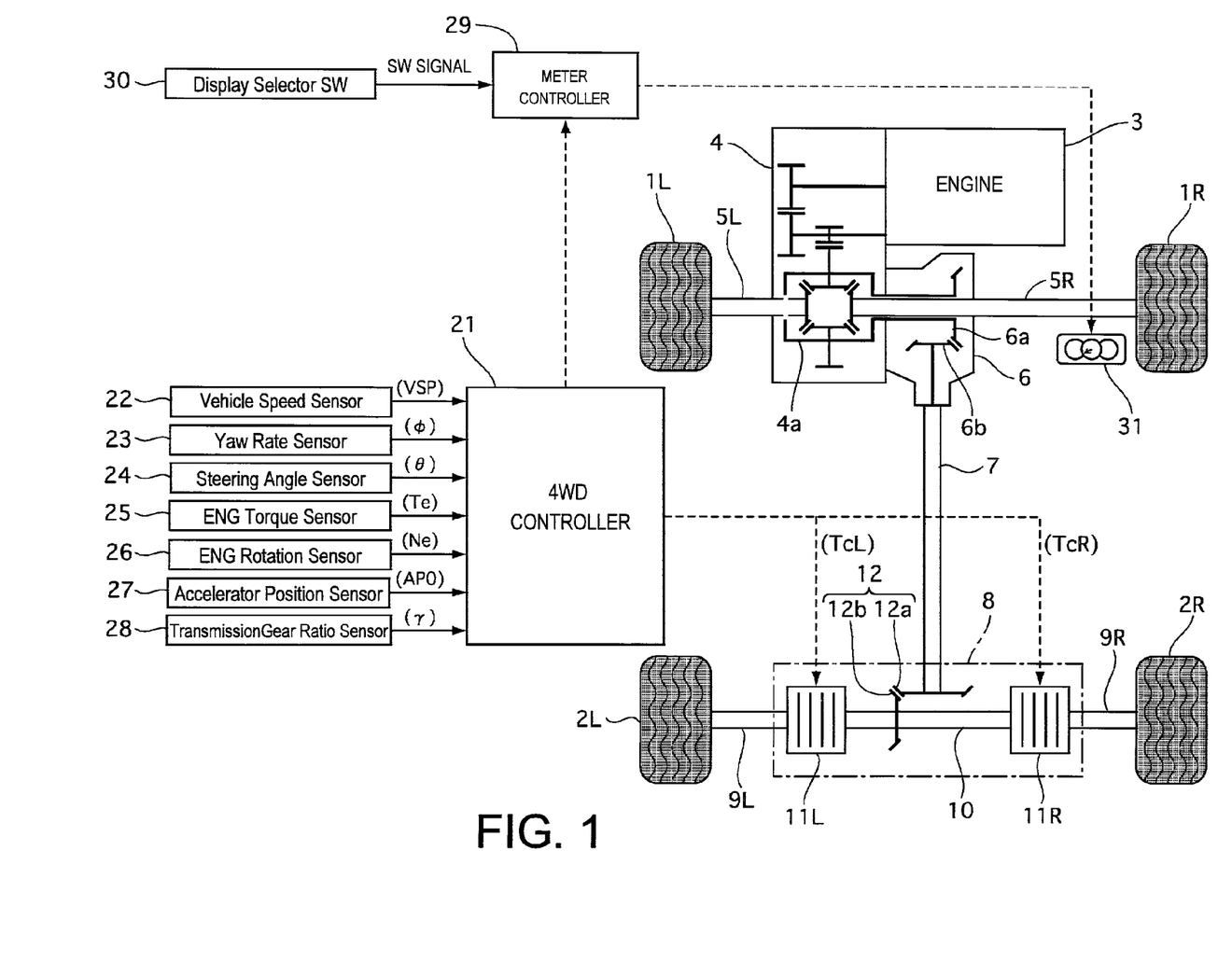
FIG. 1 is a block diagram of the vehicle drive system in a four-wheel drive vehicle of the first embodiment.

FIG. 1 is a block diagram of the vehicle drive system in a four-wheel drive vehicle of the first embodiment. The four-wheel drive vehicle of the first embodiment changes the speed of the rotational power from the engine 3 using a transmission (a transaxle including a differential device 4a) 4, directs the rotational power to the left and right front wheels 1L, 1R, which are main drive wheels, via left and right axle shafts 5L, 5R, and provides the rotational power to the driving of left and right front wheels 1L, 1R. After the speed has been changed by the transmission 4, a portion of the drive force (torque) directed to the left and right front wheels 1L, 1R is directionally changed by a transfer case 6, directed to the left and right rear wheels 2L, 2R, which are the auxiliary drive wheels, and provided to the driving of the left and right rear wheels 2L, 2R. The configuration of this transmission system will be described.

The transfer case 6 has a bevel gear assembly composed of an input hypoid gear 6a and an output hypoid gear 6b. The input hypoid gear 6a is configured so as to rotate together with a differential gear case, which is an input rotation member of the differential device 4a. The front end of a propeller shaft 7 is coupled to the output hypoid gear 6b, and the propeller shaft 7 extends rearward toward the left and right rear wheel drive force distribution unit 8. The transfer case 6 determines the gear ratio of the bevel gear assembly composed of the input hypoid gear 6a and the output hypoid gear 6b so that a portion of the drive force directed to the left and right front wheels 1L, 1R is outputted to the propeller shaft 7 at increased speed.

The speed-increasing rotational power to the propeller shaft 7 is distributed and outputted to the left and right rear wheels 2L, 2R on the basis of a target value determined by the left and right rear wheel drive force distribution unit 8. Accordingly, the left and right rear wheel drive force distribution unit 8 has a center shaft 10 disposed between the axle shafts 9L, 9R of the left and right rear wheels 2L, 2R and extending in the axial direction of the shafts 9L, 9R. The left and right rear wheel drive force distribution unit 8 furthermore has: a left rear wheel clutch 11L disposed between the center shaft 10 and the axle shaft 9L and used for coupling and controlling the shafts 10, 9L; and a right rear wheel clutch 11R disposed between the center shaft 10 and the axle shaft 9R and used for coupling and controlling the shafts 10, 9R.

The interval between the center shaft 10 and the rear end of the propeller shaft 7 extending from the transfer case 6 in the rearward direction of the vehicle is drivably coupled via a bevel gear-type final reduction gear 12 composed of an input hypoid gear 12a and an output hypoid gear 12b. The reduction ratio of the final reduction gear 12 is a gear ratio that causes a portion of the drive force directed to the left and right front wheels 1L, 1R to be directed in a speed-increasing fashion to the center shaft 10 in relation to the above-described speed-increasing gear ratio (speed-increasing gear ratio of the bevel gear assembly composed of the hypoid gear 6a and the output hypoid gear 6b) of the transfer case 6; and in the first embodiment, sets the total gear ratio of the transfer case 6 and the final reduction gear 12 so that the center shaft 10 is rotated with increased speed with respect to the left and right front wheels 1L, 1R.

In the wheel drive system of a four-wheel drive vehicle of the first embodiment, the rotational drive force from the engine 3 arrives at the left and right front wheels 1L, 1R having been reduced by the transmission (transaxle) 4, and drives the left and right front wheels 1L, 1R. In this interval, a portion of the drive force directed to the left and right front wheels 1L, 1R arrives at the center shaft 10 from the transfer case 6 in sequence via the propeller shaft 7 and the final reduction gear 12; and the left and right rear wheels 2L, 2R are driven while the engaging power of the clutches 11L, 11R is controlled so that the clutches 11L, 11R slip by an amount commensurate to the increase in speed. The vehicle can thereby travel in four-wheel drive by the driving of the left and right front wheels 1L, 1R and the driving of the left and right rear wheels 2L, 2R.

In the four-wheel drive vehicle of the first embodiment, an object is to improve the start performance and the acceleration performance of the vehicle, and the front and rear wheel drive force distribution is controlled via the total engaging force control of the left rear wheel clutch 11L and the right rear wheel clutch 11R. Another object is to improve the turning performance and stabilize the turning behavior of a vehicle, and the left and right wheel drive force distribution is controlled via the total engaging force control of the left rear wheel clutch 11L and the right rear wheel clutch 11R. Accordingly, the engaging force control system of the left rear wheel clutch 11L and the right rear wheel clutch 11R is as described below. The left rear wheel clutch 11L and the right rear wheel clutch 11R are electromagnetic clutches in which the engaging force is determined in accordance with the supplied electric current, and the supply of electric current to the clutches 11L, 11R is electronically controlled so that the engaging force of the clutches 11L, 11R achieve a engaging force that corresponds to target drive forces TcL, TcL of the left and right rear wheels 2L, 2R calculated by a four-wheel drive (4WD) controller 21, whereby the front and rear wheel drive force distribution and the left and right wheel drive force distribution are controlled.

In order to compute the above-described target drive force TcL of the left rear wheel 2L and the target drive force TcR of the right rear wheel 2R, the 4WD controller 21 receives input of a signal from a vehicle speed sensor 22 for detecting the vehicle speed VSP, a signal from a yaw rate sensor 23 for detecting the yaw rate $\phi$ around the center of the vertical axis that passes through the center of gravity of the vehicle, a signal from a steering angle sensor 24 for detecting the steering angle $\theta$ of the steering wheel, a signal from an engine torque computer 25 for computing the output torque Te of the engine 3, a signal from the engine speed sensor 26 for detecting the engine speed Ne, a signal from the accelerator position sensor 27 for detecting the accelerator position APO, which is the amount of pressure on the accelerator pedal, and a transmission gear ratio sensor 28 for detecting the gear ratio $\gamma$ currently selected by the transmission 4. The 4WD controller 21 calculates the total drive force of the vehicle based on the above input information, and calculates the rear wheel distribution (the drive force distribution of the left and right rear wheels 2L, 2R) and the difference in the rear wheel left/right distribution from the input information and the total drive force. The left rear target drive force TcL and the right rear target drive force TcR for achieving the rear wheel distribution and the difference in the rear wheel left/right distribution are calculated, and the engaging force (electric current) of the left rear wheel clutch 11L and the right rear wheel clutch 11R is electronically controlled so that the drive force of the left and right rear wheels 2L, 2R matches the target drive forces TcL, TcR.

The 4WD controller 21 computes a segment illuminating pattern for displaying the state of drive force distribution between the front and rear wheels and the left and right rear wheels on a later-described odometer (upper-side segment display) 37 and trip meter (lower-side segment display) 38 arranged in a combination meter 31, on the basis of the calculated total drive force of the vehicle, rear wheel distribution, and rear wheel right left distribution difference; and sends the computation results to the meter controller (display control means) 29 using a CAN communication line (not shown). The meter controller 29 switches the display content of the odometer 37 and the trip meter 38 sequentially between the distance (cumulative travel distance and interval travel distance) display, the drive force distribution state display, and the fuel consumption display, each time the display selector switch 30 is operated by the driver. Here, it is also possible to use a configuration in which, in addition to fuel consumption, one or more other items of vehicle information are selected for display. Such a configuration is described below. The selector switch 30 is disposed on, e.g., the steering wheel (not shown), the instrument panel, or in another position that allows operation by the driver while the vehicle is traveling.

Figure 2:
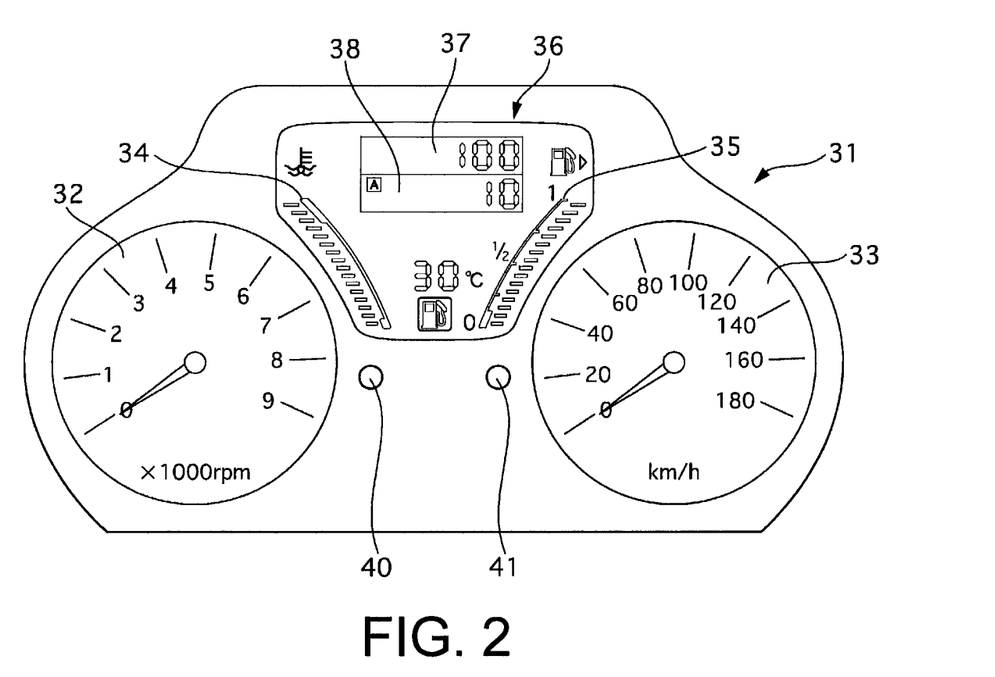
FIG. 2 is a front view of the combination meter 31 of the first embodiment.

FIG. 2 is a front view of the combination meter 31 of the first embodiment; the combination meter 31 is installed in the instrument panel (not shown), and is disposed between a tachometer 32 for displaying the engine speed of the engine 3 and a speedometer 33 for displaying the travel speed of the vehicle. A temperature gauge 34 for displaying the temperature of the engine coolant, a fuel gauge 35 for displaying the remaining amount of fuel, and a display area 36 for displaying other warnings and indicator illuminates are set in positions between the two meters 32, 33. A turn signal indicator lamp, a high-beam indicator lamp, and a shift pattern indicator lamp are disposed in the instrument panel, but are not shown.

Figure 3:
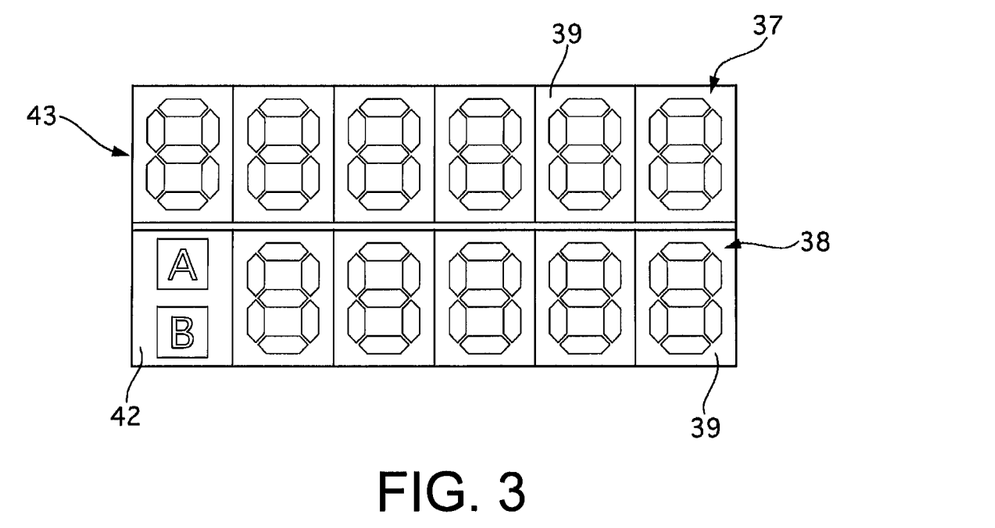
FIG. 3 is a front view of the odometer 37 and the trip meter 38 of the first embodiment.
Figure 4:
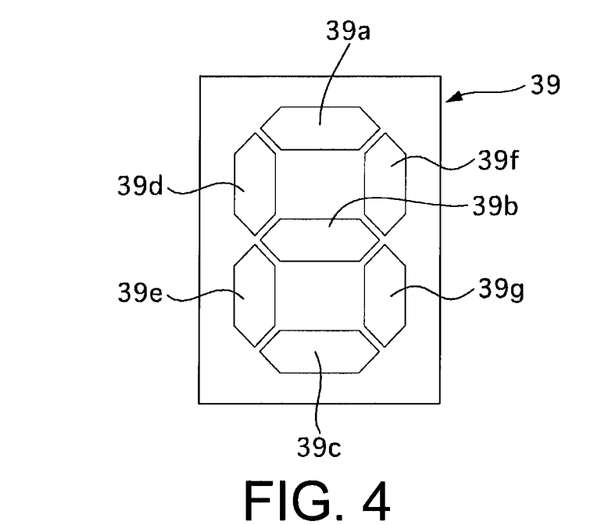
FIG. 4 is a front view of the seven-segment LED 39.

The odometer 37 for displaying the cumulative travel distance of the vehicle and a trip meter 38 for displaying the interval travel distance are disposed above and below in line in the left-right center upper part of the display area 36. The odometer 37 and the trip meter 38 calculate and display the travel distance of the vehicle using, e.g., a combination of the axle speed signal and the circumference of the tires. FIG. 3 is a front view of the odometer 37 and the trip meter 38 of the first embodiment. The odometer 37 is composed of six seven-segment LEDs (number-displaying elements) 39 lined up in the lateral direction for displaying numerical values using seven segments as shown in FIG. 4. Accordingly, the odometer 37 is capable of displaying six-digit numerical values. The trip meter 38 is composed of five seven-segment LEDs (number-displaying elements) 39 lined up in the lateral direction in the same manner as the odometer 37. Accordingly, the trip meter 38 is capable of displaying five-digit numerical values. The odometer 37 and the trip meter 38 are disposed in the same position in the lateral direction of the seven-segment LEDs 39 from the ones position. The driver can reset the display of the odometer 37 to zero by pressing a reset button 40. The trip meter 38 can be switched between trip meters A and B in alternating fashion each time a selector switch 41 is pressed by the driver to display two interval travel distances. A character display unit 42 for illuminating one of the characters A and B is disposed on the left end of the trip meter 38. The meter controller 29 illuminates the character A when the trip meter A is being displayed, and illuminates the character B with the trip meter B is being displayed. The driver can reset the display of the trip meter 38 to zero by pressing the selector switch 41 for a predetermined length of time or greater.

FIG. 4 is a front view of the seven-segment LED 39 used in the odometer 37 and the trip meter 38. The seven-segment LED 39 has three lateral segments 39a, 39b, 39c extending in the lateral direction, and four upright segments 39d, 39e, 39f, 39g extending in the longitudinal direction. The upper row lateral segment 39a is positioned in the upper row, the middle row lateral segment 39b is positioned in the middle row, and the lower row lateral segment 39c is positioned in the lower row. The left upper row upright segment 39d is positioned in the left upper row, the left lower row upright segment 39e is positioned in the left lower row, the right upper row upright segment 39f is positioned in the right upper row, and the right lower row upright segment 39g is positioned in the right lower row. As described above, the odometer 37 and the trip meter 38 are sequentially switched between display of the cumulative travel distance and the interval travel distance, display of the state of drive force distribution to each wheel, and display of fuel consumption each time the display selector switch 30 is operated. Five of the seven-segment LEDs 39 constituting the trip meter 38 and five of the seven-segment LEDs 39 from the right of the six seven-segment LEDs 39 constituting the odometer 37, totaling 10 seven-segment LEDs 39, are used as the display for the drive force distribution state. The odometer 37 and the trip meter 38 used in combination are herein below referred to as the drive force distribution display unit 43.

Figure 5:
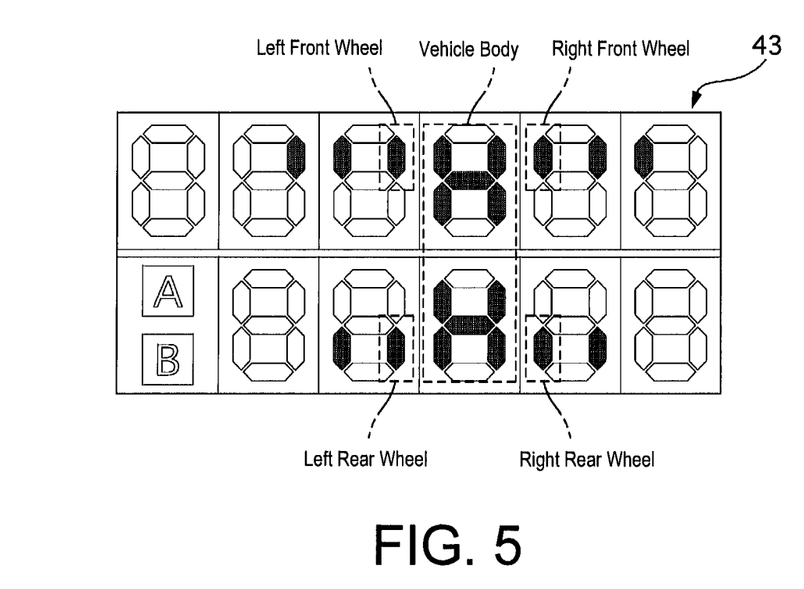
FIG. 5 is a display example of the drive force distribution display unit 43 during linear forward travel.
Figure 6:
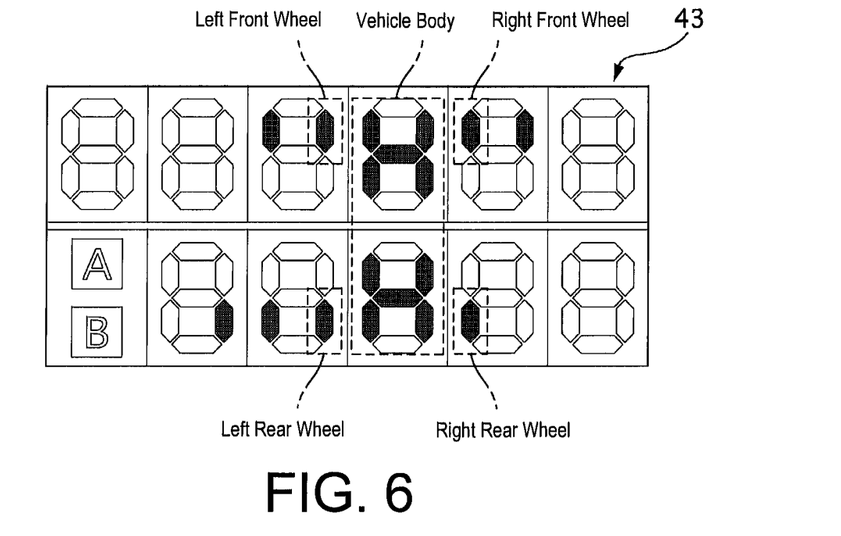
FIG. 6 is a display example of the drive force distribution display unit 43 during a right turn.

FIG. 5 is a display example of the drive force distribution display unit 43 during linear forward travel, and FIG. 6 is a display example of the drive force distribution display unit during a right turn. The two upper and lower seven-segment LEDs 39 in the lateral center are illuminated in the drive force distribution display unit 43 in an "H"-shape, in other words, five segments excluding the upper row lateral segment 39a and the lower row lateral segment 39c are illuminated to display a symbol than resembles a vehicle body, as shown in FIGS. 5 and 6. Also, the right upper row upright segment 39f of the seven-segment LED 39 adjacent to the left of the upper seven-segment LED 39 displaying the vehicle body, and the left upper row upright segment 39d of the seven-segment LED 39 adjacent to the right of the upper seven-segment LED 39 displaying the vehicle body are illuminated to display a symbol resembling the left and right front wheels 1L, 1R. The right lower row upright segment 39g of the seven-segment LED 39 adjacent to the left of the lower seven-segment LED 39 displaying the vehicle body, and the left lower row upright segment 39e of the seven-segment LED 39 adjacent to the right of the lower seven-segment LED 39 displaying the vehicle body, are illuminated to display a symbol resembling the left and right rear wheels 2L, 2R.

The drive force distribution state of the left front wheel 1L is expressed by the number of display segments (0 to 3), which is the number of segments to be illuminated using the three upper row upright segments that are positioned to the left of the right upper row upright segment 39f and that display the left front wheel 1L. The drive force distribution state of the right front wheel 1R is expressed by the number of display (illuminated) segments (0 to 3) using the three upper row upright segments that are positioned to the right of the left upper row upright segment 39d and that display the right front wheel 1R. The drive force distribution state of the left rear wheel 2L is expressed by the number of display (illuminated) segments (0 to 3) using the three lower row upright segments that are positioned to the left of the right lower row upright segment 39g and that display the left rear wheel 2L. The drive force distribution state of the right rear wheel 2R is expressed by the number of display (illuminated) segments (0 to 3) using the three lower row upright segments that are positioned to the right of the left lower row upright segment 39e and that display the right rear wheel 2R.

For example, the number of display segments that correspond to the left and right rear wheels 2L, 2R is the same, as shown in FIG. 5, because the drive force of the left and right rear wheels 2L, 2R is the same during linear forward travel. At this time, the number of display segments corresponding to the left and right rear wheels 2L, 2R with respect to the total number of display segments is increased in commensurate fashion to the magnitude of the rear wheel distribution. The total number of display segments is increased in commensurate fashion to the magnitude of the total drive force of the vehicle. The total number of display segments that correspond to each wheel is zero when the vehicle is stopped. With reference to the left and right rear wheels 2L, 2R, the number of display segments that correspond to the left rear wheel 2L, which is the turning outside wheel, is made greater than the number of display segments that correspond to the right rear wheel 2R, which is the turning inside wheel, because the drive force of the turning outside wheel is greater than the drive force of the turning inside wheel during a turn, as shown in FIG. 6. At this time, the difference in the number of display segments corresponding to the left and right rear wheels 2L, 2R is increased in commensurate fashion to the magnitude of the difference in the rear wheel left/right distribution. The number of display segments is varied in accordance with the rear wheel distribution and the total drive force of the vehicle.

Figure 7:
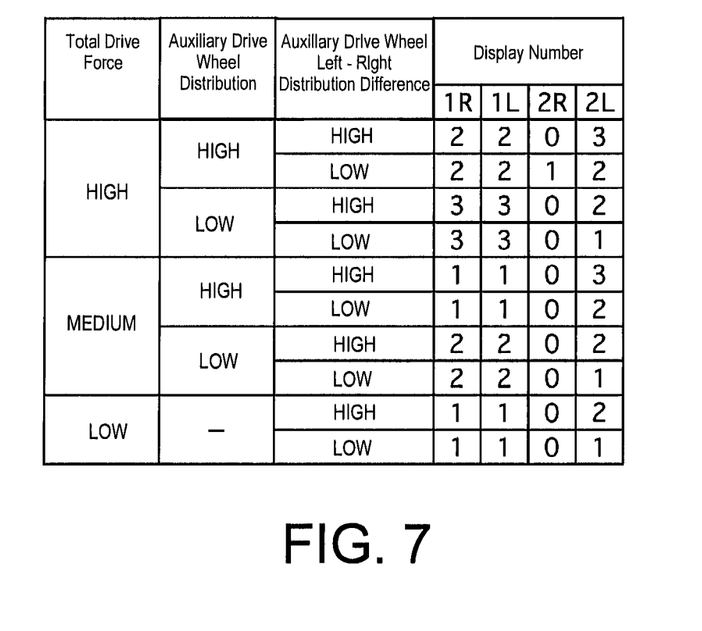
FIG. 7 is an example of a segment display pattern when there is a difference in the rear, left, and right distribution during a left turn.

FIG. 7 is an example of a segment display pattern during a left turn when there is a difference in the rear, left, and right distribution. The 4WD controller 21 divides the total drive force of the vehicle into three drive force regions: high, intermediate, and low. In each drive force region, the rear wheel distribution and the difference in the rear wheel left/right distribution are divided into two regions: high and low, and the segment display pattern is made to be different in each region. Here, the rear wheel distribution is not divided only in the case that the total motive drive force of the vehicle is low. This is because when the total drive force of the vehicle is low, the rear wheel distribution is very low and the difference in the number of display segments cannot be produced even if the rear wheel distribution were to be divided into high and low levels. Therefore, it is apparent, for example, that the display example of FIG. 6 is a segment display pattern for when the total drive force is "intermediate" in FIG. 7, the rear wheel distribution is "high," and the difference in the rear wheel left/right distribution is "low." The numerical values of 2R and 2L of FIG. 7 are reversed in the case of a right turn, and a description is therefore omitted.

Here, in the display pattern shown in FIG. 7, the number of display segments corresponding to the right rear wheel 2R is zero except when the total drive force of the vehicle is "high," the rear wheel distribution is "high," and the difference in the rear wheel left/right distribution is "low," but this does not necessarily indicate that the drive force of the right rear wheel 2R is zero. In the first embodiment, the number of display segments is determined in accordance with the difference in the rear wheel left/right distribution, and the number of display segments that correspond to each wheel is a maximum of three. Therefore, the number of display segments of the wheel having a low drive force distribution of the left and right rear wheels 2L, 2R is zero in the case that the three parameters, namely, the total drive force of the vehicle, the rear wheel distribution, and the difference in the rear wheel left/right distribution are expressed using a small number of display segments. In other words, setting the number of display segments to zero for a wheel having a low drive force distribution of the left and right rear wheels 2L, 2R allows the three parameters, i.e., the total drive force of the vehicle, the rear wheel distribution, and the difference in the rear wheel left/right distribution to be expressed using a greater number of patterns.

Next, the effect of the first embodiment will be described. Effects such as those described below can be obtained in accordance with the drive force distribution display device of the first embodiment described above.

(1) The present invention is provided with an odometer 37 and trip meter 38 arranged vertically in a line, and a meter controller 29 for displaying a vehicle body using the two upper and lower seven-segment LEDs 39 near the lateral center between the odometer 37 and the trip meter 38, and displaying the state of drive force distribution between the wheels (the state of drive force distribution between the front and rear wheels and the state of drive force distribution between the left and right wheels) using the seven-segments LED 39 to the left and right of the two upper and lower seven-segment LEDs 39 that display the vehicle body.

The odometer 37 and the trip meter 38 are composed of inexpensive seven-segment LEDs 39 having a plurality of digits in a line, and manufacturing costs can be minimized in comparison with displaying the state of drive force distribution between the wheels using a conventional liquid crystal screen.

(2) The meter controller 29 displays, as the state of drive force distribution between the wheels, the state of drive force distribution between the left and right front wheels 1L, 1R and the left and right rear wheels 2L, 2R, and the state of drive force distribution between the left and right rear wheels 2L, 2R. Accordingly, the driver can be notified about the state of drive force distribution between the left and right front wheels 1L, 1R and the left and right rear wheels 2L, 2R, and the state of drive force distribution between the left and right rear wheels 2L, 2R when a turn is being made by a four-wheel drive vehicle that can adjust the drive force distribution of the front and rear wheels and the drive force distribution of the left and right rear wheels 2L, 2R as in the first embodiment.

(3) The meter controller 29 is divided into two regions "high" and "low" in accordance with the drive force distribution of the left and right rear wheels 2L, 2R in relation to the left and right front wheels 1L, 1R, the two regions are further divided into two regions "high" and "low" in accordance with the difference in the rear wheel left/right distribution of the left and right rear wheels 2L, 2R, and the segment display pattern is made to be different in each region. The driver can be notified whether rear wheel drive force distribution, which is the minimum required information, is high, and whether the rear wheel left/right distribution is high, using a four-segment display pattern.

(4) The meter controller 29 divides the total drive force of the vehicle into three drive force regions: high, intermediate, and low; divides the drive force regions "high" and "low" into four regions in accordance with the rear wheel drive force distribution and the difference in the rear wheel left/right distribution as described above; and divides the "low" drive force region into two regions in accordance with the difference in the rear wheel left/right distribution. In addition to the magnitude of the rear wheel drive force distribution and the magnitude of the difference in the rear wheel left/right distribution, the driver can be notified about the magnitude of the drive force of the vehicle. Also, 10 states can be expressed within the restriction of a maximum three display segments corresponding to the wheels.

(5) The odometer 37 and trip meter 38, which are always provided to a combination meter for a passenger vehicle, are used as the drive force distribution display unit 43. Therefore, a dedicated display device for displaying the drive force distribution state is not required, and manufacturing costs can be minimized in comparison with the case in which a dedicated display device is separately provided.

(6) The odometer 37 and the trip meter 38 are sequentially switched between the distance display, the drive force distribution state display, and the fuel consumption display, each time the display selector switch 30 is operated. Therefore, the driver can switch to the drive force distribution state display only when necessary, and can elect not to display the drive force distribution state when not required.

The meter controller 29 can display a symbol resembling the vehicle body in a planar shape using two seven-segment LEDs 39 in the center because the two upper and lower seven-segment LEDs 39 in the lateral center are illuminated in an "H"-shape. Therefore, the driver can instantly discern the drive force distribution state of each wheel and visibility can be improved.

(8) Among the upper row upright segments of the two seven-segment LEDs 39, 39 laterally adjacent to the upper seven-segment LED 39 illuminated in an "H"-shape, the upper row upright segments that are on the sides near the seven-segment LED 39 illuminated in an "H"-shape are illuminated by the meter controller 29 so that the left and right front wheels are displayed, and among the lower row upright segments of the two seven-segment LEDs 39, 39 laterally adjacent to the lower seven-segment LED 39 illuminated in an "H"-shape, the lower row upright segments that are on the sides near the seven-segment LED 39 illuminated in an "H"-shape are illuminated by the meter controller 29 so that the left and right rear wheels are displayed. A symbol resembling the vehicle body in a planar shape using two seven-segment LEDs 39 can thereby be displayed in the center. Accordingly, improvement in the visibility and design can be ensured.

Figure 8:
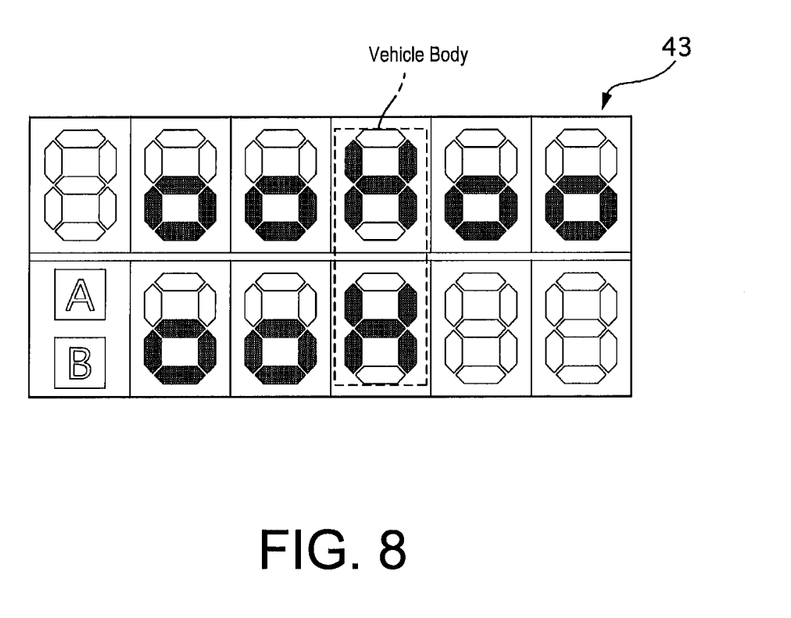
FIG. 8 is a display example of the drive force distribution display unit 43 during a right turn in another embodiment.

A preferred embodiment of the present invention was described above using an example, but the specific configuration of the present invention is not limited to the example; the present invention encompasses design modifications and the like that do not depart from the spirit of the invention. For example, it is possible to display only the vehicle body in the center of the drive force distribution display unit 43 and to omit display of the wheels, as shown in FIG. 8. Also, the segments to be displayed are not limited to the upright segments, and it is also possible to display rectangles such as those in FIG. 8 as a single symbol. FIG. 8 is another display example during a right turn in the same conditions as FIG. 6. In other words, this is the segment display pattern in FIG. 7 for a drive force that is "intermediate," a rear wheel distribution that is "high," and a difference in the rear wheel left/right distribution that is "low."

In the first embodiment, an example was described in which the odometer and trip meter displays are switched from distance display to drive force distribution state display using the switch operation by the driver as a trigger. However, it is also possible to use a configuration in which the switch is automatically made from distance display to drive force distribution state display using a change in the state of the drive force distribution to the front and rear wheels and/or the state of the drive force distribution to the left and right wheels as a trigger.

The invention claimed is:

1. A vehicle display device comprising:
a vehicle instrument panel;
an upper-side segment display comprising at least three number-displaying elements arranged in a line in a lateral direction for displaying numerical values using a plurality of segments, the upper-side segment display being disposed in the vehicle instrument panel;
a lower-side segment display comprising at least three number-displaying elements in a line in the lateral direction for displaying numerical values using a plurality of segments, the lower-side segment display being disposed below the upper-side segment display in the vehicle instrument panel; and
a display controller configured to combine the number-displaying elements in the upper-side and lower-side segment displays and to display vehicle information, the display controller being further configured to display a vehicle body using the two upper and lower number-displaying elements near the lateral center in the upper-side and lower-side segment displays, and to display a state of drive force distribution between wheels using left and right number-displaying elements of the upper and lower number-displaying elements that show the vehicle body, the controller being further configured to change a number of the segments of at least one of the upper and lower-side segment displays to be illuminated to indicate a change in magnitude of a total drive force of the vehicle.

2. The vehicle display device according to claim 1, wherein the display controller is further configured to display the state of drive force distribution between main drive wheels and auxiliary drive wheels and the state of drive force distribution between left and right wheels as the state of drive force distribution between the wheels.

3. The vehicle display device according to claim 2, wherein the display controller is further configured to divide the state of drive force distribution between the main drive wheels and the auxiliary drive wheels into a plurality of regions in accordance with the drive force distribution of the auxiliary drive wheels with respect to the main drive wheels and the difference in the drive force distribution between the left and right wheels, and to cause the segment display pattern of the number-displaying elements for displaying the state of drive force distribution between the wheels to be different in each of the regions.

4. The vehicle display device according to claim 3, wherein the display controller is further configured to divide the state of drive force distribution between the main drive wheels and the auxiliary drive wheels into a plurality of drive force regions in accordance with a total drive force distribution of a vehicle, and to divide the drive force regions into a plurality of regions in accordance with the drive force distribution to the auxiliary drive wheels with respect to the main drive wheels and the difference in the drive force distribution of the left and right wheels.

5. The vehicle display device according to claim 1, wherein the display controller is further configured to divide the state of drive force distribution between the main drive wheels and the auxiliary drive wheels into a plurality of regions in accordance with the drive force distribution of the auxiliary drive wheels with respect to the main drive wheels and the difference in the drive force distribution between the left and right wheels, and to cause the segment display pattern of the number-displaying elements for displaying the state of drive force distribution between the wheels to be different in each of the regions.

6. The vehicle display device according to claim 5, wherein the display controller is further configured to divide the state of drive force distribution between the main drive wheels and the auxiliary drive wheels into a plurality of drive force regions in accordance with a total drive force distribution of a vehicle, and to divide the drive force regions into a plurality of regions in accordance with the drive force distribution to the auxiliary drive wheels with respect to the main drive wheels and the difference in the drive force distribution of the left and right wheels.

7. A vehicle display device comprising:
a vehicle instrument panel;
an upper-side segment display comprising at least three number-displaying elements arranged in a line in a lateral direction for displaying numerical values using a plurality of segments, the upper-side segment display being disposed in the vehicle instrument panel;
a lower-side segment display comprising at least three number-displaying elements in a line in the lateral direction for displaying numerical values using a plurality of segments, the lower-side segment display being disposed below the upper-side segment display in the vehicle instrument panel,
the upper-side and lower-side segment displays being displays for displaying one or more vehicle states, and being sequentially switched between display of the one or more vehicle states and display of the drive force distribution state each time a manual display selector switch is operated; and
a display controller configured to combine the number-displaying elements in the upper-side and lower-side segment displays and to display vehicle information, the display controller being further configured to display a vehicle body using the two upper and lower number-displaying elements near the lateral center in the upper-side and lower-side segment displays, and to display a state of drive force distribution between wheels using left and right number-displaying elements of the upper and lower number-displaying elements that show the vehicle body.

8. The vehicle display device according to claim 7, wherein the display controller is further configured to control one of the upper-side and lower-side segment displays as an odometer for displaying a cumulative travel distance as predetermined vehicle information, and the display controller is further configured to control the other of the upper-side and lower-side segment displays as a trip meter for displaying an interval travel distance as predetermined vehicle information.

9. The vehicle display device according to claim 7, wherein the display controller is further configured to display the state of drive force distribution between main drive wheels and auxiliary drive wheels and the state of drive force distribution between left and right wheels as the state of drive force distribution between the wheels.

10. The vehicle display device according to claim 9, wherein
the display controller is further configured to control one of the upper-side and lower-side segment displays as an odometer for displaying a cumulative travel distance as predetermined vehicle information, and the display controller is further configured to control the other of the upper-side and lower-side segment displays as a trip meter for displaying an interval travel distance as predetermined vehicle information.

11. A vehicle display device comprising:
a vehicle instrument panel;
an upper-side segment display comprising at least three number-displaying elements arranged in a line in a lateral direction for displaying numerical values using a plurality of segments, the upper-side segment display being disposed in the vehicle instrument panel, the number-displaying elements of the upper-side segment display being a seven-segment LED;
a lower-side segment display comprising at least three number-displaying elements in a line in the lateral direction for displaying numerical values using a plurality of segments, the lower-side segment display being disposed below the upper-side segment display in the vehicle instrument panel, the number-displaying elements of the lower-side segment display being a seven-segment LED;
a display controller configured to combine the number-displaying elements in the upper-side and lower-side segment displays and to display vehicle information, the display controller being further configured to display a vehicle body using the two upper and lower number-displaying elements near the lateral center in the upper-side and lower-side segment displays, to display a state of drive force distribution between wheels using left and right number-displaying elements of the upper and lower number-displaying elements that show the vehicle body, and the display controller being further configured to illuminate one of the number-displaying elements of the upper-side segment display and one of the number-displaying elements of the lower-side segment display, which are located near a lateral center of the upper-side and lower-side segment displays, in an "H"-shape to display the vehicle body.

12. The vehicle display device according to claim 11, wherein
the display controller is further configured to illuminate two of the number-displaying elements of the upper-side segment display that are laterally adjacent the one of the number-displaying elements of the upper-side segment display that is illuminated in the "H"-shape to display left and right front wheels; and
the display controller is further configured to illuminate two of the number-displaying elements of the lower-side segment display that are laterally adjacent the one of the number-displaying elements of the upper-side segment display that is in the "H"-shape to display left and right rear wheels.

13. The vehicle display device according to claim 11, wherein
the display controller is further configured to display the state of drive force distribution between main drive wheels and auxiliary drive wheels and the state of drive force distribution between left and right wheels as the state of drive force distribution between the wheels.

14. The vehicle display device according to claim 13, wherein
the display controller is further configured to illuminate two of the number-displaying elements of the upper-side segment display that are laterally adjacent the one of the number-displaying elements of the upper-side segment display that is illuminated in the "H"-shape to display-left and right front wheels; and
the display controller is further configured to illuminate two of the number-displaying elements of the lower-side segment display that are laterally adjacent the one of the number-displaying elements of the upper-side segment display that is in the "H"-shape to display left and right rear wheels.

* * * * *